United States Patent
Lamberti

(10) Patent No.: US 8,720,921 B1
(45) Date of Patent: May 13, 2014

(54) VEHICULAR SUSPENSION ENHANCEMENT

(71) Applicant: SuperSprings International, Inc., Carpinteria, CA (US)

(72) Inventor: Gerard A. Lamberti, Carpinteria, CA (US)

(73) Assignee: SuperSprings International, Inc., Carpinteria, CA (US)

( * ) Notice: Subject to any disclaimer, the term of this patent is extended or adjusted under 35 U.S.C. 154(b) by 0 days.

(21) Appl. No.: 14/065,765

(22) Filed: Oct. 29, 2013

Related U.S. Application Data

(60) Provisional application No. 61/720,151, filed on Oct. 30, 2012.

(51) Int. Cl.
*B60G 11/38* (2006.01)
*B60G 11/40* (2006.01)
*B60G 11/42* (2006.01)

(52) U.S. Cl.
USPC ..... 280/124.164; 267/30; 267/153; 280/124.174

(58) Field of Classification Search
USPC ........ 280/124.164, 124.174; 267/30, 35, 153, 267/219, 258
See application file for complete search history.

(56) References Cited

U.S. PATENT DOCUMENTS

| | | | | |
|---|---|---|---|---|
| 1,636,099 A | * | 7/1927 | Lipcot | 267/30 |
| 1,735,899 A | * | 11/1929 | Henry | 267/30 |
| 1,869,137 A | * | 7/1932 | Flintermann | 267/30 |
| 1,894,973 A | * | 1/1933 | Bell | 267/30 |
| 2,035,937 A | * | 3/1936 | Anderson | 180/291 |
| 2,445,723 A | * | 7/1948 | Brown | 267/258 |
| 2,481,817 A | * | 9/1949 | Bradley et al. | 267/247 |
| 2,608,401 A | * | 8/1952 | Burt | 267/30 |
| 2,659,595 A | * | 11/1953 | Coda | 267/30 |
| 2,775,353 A | * | 12/1956 | Tillou | 213/34 |
| 2,973,952 A | * | 3/1961 | Heintzelman | 267/30 |
| 3,203,361 A | | 8/1965 | Sharp | |
| 3,323,786 A | * | 6/1967 | Boschi | 267/292 |
| 3,396,963 A | | 8/1968 | Hutchins | |
| 3,477,674 A | | 11/1969 | Schaller | |
| 3,625,501 A | | 12/1971 | Hein et al. | |
| 3,730,550 A | * | 5/1973 | Thaxton | 280/124.163 |
| 3,799,571 A | * | 3/1974 | Sudberry | 280/124.174 |

(Continued)

FOREIGN PATENT DOCUMENTS

IT  TO950457 A1  12/1996

OTHER PUBLICATIONS

Firestone Industrial Products Company, Air Spring Warranty Evaluation Criteria (AWECO7 4 page brochure), copyright 2007.

(Continued)

*Primary Examiner* — Nicole Verley
(74) *Attorney, Agent, or Firm* — Ralph D. Chabot

(57) ABSTRACT

A vehicular suspension enhancer comprises a pair of vertically oriented spring portions, one portion mounted to the axle and the other portion mounted to the frame. Each vehicle axle can be equipped with two suspension enhancers, one enhancer located on each side of an axle. Each of the spring portions are positioned in the space between the axle and the vehicular frame, with the distal ends of each spring portion facing one another with a space between the distal ends defining a gap. The gap between the facing spring portions will increase in response to an increase in the distance between frame and axle.

18 Claims, 3 Drawing Sheets

(56) References Cited

U.S. PATENT DOCUMENTS

| | | | |
|---|---|---|---|
| 4,191,398 A * | 3/1980 | Willetts | 280/683 |
| 4,615,513 A | 10/1986 | Thaung et al. | |
| 4,735,970 A | 4/1988 | Sommerfeld et al. | |
| 4,745,135 A | 5/1988 | Thomas et al. | |
| 4,790,521 A * | 12/1988 | Ide et al. | 267/219 |
| 4,962,916 A | 10/1990 | Palinkas | |
| 5,021,534 A | 6/1991 | Kawasaki et al. | |
| 5,295,755 A | 3/1994 | DeHaan et al. | |
| 5,308,104 A * | 5/1994 | Charles | 280/124.155 |
| 5,518,227 A | 5/1996 | Whelan | |
| 5,549,271 A * | 8/1996 | Hamaekers | 248/621 |
| 6,439,550 B1 * | 8/2002 | Koch | 267/64.23 |
| 6,663,091 B2 * | 12/2003 | West | 267/140.13 |
| 6,820,883 B2 | 11/2004 | Lang et al. | |
| 7,307,136 B2 * | 12/2007 | Bleys et al. | 528/67 |
| 7,841,607 B2 * | 11/2010 | Dodd | 280/124.128 |
| 8,348,250 B2 * | 1/2013 | Hofmann et al. | 267/140.13 |
| 2003/0226556 A1 * | 12/2003 | Leven | 124/89 |
| 2007/0120301 A1 * | 5/2007 | Domen et al. | 267/152 |
| 2008/0029215 A1 * | 2/2008 | Delfino et al. | 156/327 |
| 2008/0290572 A1 * | 11/2008 | Desprez et al. | 267/178 |
| 2009/0110894 A1 * | 4/2009 | Nybakken et al. | 428/220 |
| 2012/0211963 A1 * | 8/2012 | Muck | 280/124.174 |
| 2013/0000841 A1 * | 1/2013 | Delfino et al. | 156/307.3 |
| 2013/0316852 A1 * | 11/2013 | Sullivan et al. | 473/373 |

OTHER PUBLICATIONS

Timbren Industries Inc., Aeon Hollow Rubber Springs, from webpage http://www.timbren.com/aeon-spring-typical-uses.htm, copyright 1996-2007.

Bayer Materialscience, pp. 1, 13 and 23 taken from BaySystems customized polyurethanes 24 page brochure, Edition: Feb. 2007.

Bayer Material Science, Vulkollan webpage http://www.bayer-baysystems.com/bms/baysystems.nsf/id/01_LEV_EN_Vulkollan#, copyright unknown.

Bayer Material Science, Cellular Vulkollan webpage http://www.bayer-baysystems.com/bms/baysystems.nsf/id/01_LEV_EN_Cellular_Vulkollan?open&I=01_LEV_EN, copyright unknown.

* cited by examiner

VEHICULAR SUSPENSION ENHANCEMENT

CROSS REFERENCE TO RELATED APPLICATIONS

This application claims the benefit of U.S. provisional patent application bearing Ser. No. 61/720,151 filed Oct. 30, 2012, the contents of which is hereby incorporated by reference herein in its entirety for all purposes.

BACKGROUND OF THE INVENTION

Vehicular suspensions are well known for providing a smoother and more comfortable ride for driver and passengers. A typical embodiment for a rear suspension system utilizes a combination of leaf spring packs which provide support, and shock absorbers which provide damping; both of which are operatively attached between the axle and vehicular chassis frame. When traveling upon a rough road or off-road terrain, the vehicle wheels and axles can rapidly oscillate up and down; the frequency increasing with increased velocity of the vehicle and the severity of the terrain. This oscillation is facilitated by the vehicle's suspension system which determines the extent of vertical travel distance and degree of occupant comfort.

When a vehicle such as a pick-up truck has its cargo bed heavily loaded, the supporting springs compress downward upon the rear end causing the front end of the vehicle to rise. This downward movement of the frame towards the rear axle reduces the available vertical travel range of the rear suspension. For vehicles having their wheels positioned underneath the frame in a tire well, an extreme load could cause the tires to undesirably contact the vehicular body or cause the axle to contact the frame. As a preventative measure, rear bump-stops or limiters have been utilized such as those described in U.S. Pat. No. 5,857,687 issued to Ishii which while preventing damage to the vehicle, do little to address ride comfort of the occupants of the vehicle. The rear end sag also negatively impacts steering control and handling as the vehicular load is not properly distributed between front and rear suspensions.

Furthermore, pick-up truck manufacturers presently are designing trucks with the ride quality of a sedan in an effort to attract a broader customer base. To achieve this additional level of ride comfort, leaf spring-packs have been substantially lengthened. The drawback is that a longer spring-pack does not support as heavy a load as do shorter spring-packs. Also, longer spring-packs are susceptible to increased lateral twisting which increases the propensity for body roll. Many drivers do not carry substantial loads and these concerns do not become an issue. However, for vehicles which often carry heavy loads, longer spring-packs provide a comfortable ride when the heavy load is not present but cause the distance between frame and axle to become undesirably close when loaded. This reduced vertical distance is detrimental to ride quality. For this situation, the incorporation of a suspension enhancement becomes a necessity for improving ride comfort.

Prior art suspension enhancers are limited in their maximum displacement; i.e. from total compression to total stretch; otherwise known as wheel travel. A faster rate of wheel travel, i.e. a faster rate that the enhancer can change from total compression to total stretch, is highly desirable particularly in demanding conditions, such as off-road.

With respect to traveling in off-road conditions, it was observed that most vehicles are generally light weight and are unable to effectively stretch or elongate existing prior art suspension enhancers fast enough to keep both rear wheels fully in contact with the road surface. Ride comfort was further exacerbated when vehicles attempt to make sharp turns at higher speed the inside rear wheel will momentarily lose contact with the ground and traction is lost during this period.

One example of a prior art suspension enhancer is a product marketed by Timbren Industries Inc., Ajax, Ontario, Canada. The enhancer comprises an extended hollow cylindrical-shaped piece of resilient rubber which replaces the factory bump-stop and is attached to the vehicular chassis frame. The product when installed, does not contact with the adjacent axle; rather, it provides a spacing such as 1 inch or more. When the bed of a pick-up equipped with this product is loaded with sufficient weight, the vehicle frame will lower and the product will contact the vehicle axle. While this product does provide additional support and ride comfort when an increased load is being hauled, the product is detrimental to ride comfort in situations where no additional load is being hauled. For this lighter-load situation, the product will only contact the adjacent axle when the axle displaces upward as a result of a compression event occurring; such as when the vehicle traverses a speed-bump, pothole or other roadway elevation. This contact is more aptly described as an impact event since the rubber contact with the axle is often hard and sudden, and a suitable damping effect is lacking as undesired oscillation can continue for some time.

SUMMARY OF THE INVENTION

A vehicular suspension enhancer is disclosed which improves upon the prior art embodiments to provide a more efficient load support system for vehicles. The suspension enhancer of my invention is a complimentary addition to the vehicle's suspension system. Rather than a suspension enhancer comprising a single spring which is mounted on one end to the axle and on the other end to the frame, the suspension enhancer of the present invention comprises an upper spring portion mounted to the frame and a separate lower spring portion mounted to the axle and aligned for the distal surfaces of each to engage one another.

The upper spring portion and lower spring portion are detached from each other yet remain aligned for contact. The only contact occurs when the facing distal ends mate, an example of which is illustrated in FIG. 4 as a result of a decrease in distance between axle and frame.

The vehicular suspension enhancer is particularly designed for use with vehicles having suspension systems which are designed for ride comfort. When a heavy load is to be carried by this type of vehicle equipped with the suspension enhancers, the spring portions will provide additional support and damping character necessary to maintain the ride comfort of the occupants.

By utilizing a suspension enhancer having separate upper and lower spring portions, the damping character of the enhancer can be improved without consideration of the rate of change from a compressed condition to a stretched condition as is the case for a single piece enhancer connected to both frame and axle.

A preferred embodiment of the two-portion spring enhancer has at least one of the portions being a casting consisting of cellular polyurethane foam. This material has been shown to exhibit superior damping characteristics when compared to other materials used in prior art suspension systems such as rubber or neoprene. The spring portions contemplated by my invention are non-metallic compositions since metallic compositions possess less than desired damping quality and resiliency related to wheel travel. In a first situation, the spring portions are compressible into one another when a force displaces the axle toward the vehicle frame and independent of one another in the opposite direction of travel. In a second situation and specifically when a pair of suspension enhancers are mounted to a rear axle and the vehicle is temporarily hauling a heavy load, the spring portions will remain in constant contact.

The preferred use of my suspension enhancer is in combination with the existing rear suspension system of a vehicle intended to carry or tow heavy loads and/or traveling off-road although the enhancer can also be used to supplement the front axle suspension.

By having separate spring portions, my suspension enhancer does not diminish the maximum possible unrestricted vertical wheel travel for the existing rear suspension system of the vehicle. This two-portion suspension enhancer configuration, in combination with the superior damping characteristics of the material of construction, maximizes driver comfort particularly when heavily loaded and/or when travelling on poor road conditions. The separate spring portions are designed and mounted to the vehicle so that each will be in contact with one another during a compression event and can separate away from each other as the distance between axle and frame exceed a predetermined distance.

Preferably, when both spring portions are correctly mounted respectively to axle and frame of an unloaded vehicle, a gap or vertical space is present between the distal ends. This preferred configuration takes into account that the existing suspension system of the vehicle is adequate for non-heavy load situations. Nevertheless, mounting of the spring portions can be configured so that the distal ends are in contact with each other so no gap exists unless an event occurs which increases the distance between axle and frame.

Because of separate spring portions being implemented, it is critical that the spring portions be correctly aligned with one another so that the proper support and damping effect can be achieved. Preferably, the distal end of one of the spring portions will have a male extension and the other spring portion will have a complimentary female cavity for engagement with the male extension.

As used herein, upper spring portion and lower spring portion consist of resilient non-metallic spring compositions.

In one preferable embodiment of my invention, the bottom face of the upper spring portion mounted to the frame and the top face of the lower spring portion mounted to the axle are formed as a "spigot and socket" type joint as best illustrated in FIG. 4. The conical length of the male extension and the complimentary female cavity of the opposing spring portion facilitates proper alignment during a compression event which causes the distance between axle and frame to shorten. Proper alignment is critical to ensure maximum surface area contact between both faces and optimum effectiveness as a damping device. In a most preferred embodiment of the invention, the top end of the conical male extension is flat rather than pointed. The flat top area of the male extension and the complimentary flat surface on the upper portion increases the overall contact surface area of the upper and lower spring portions.

In another embodiment of my invention, the male extension is defined by a segment of the top face which is convex which contacts with a complimentary female cavity of the distal portion that is concave.

To ensure my male/female joint design would function in the sandy conditions of a desert as well as the icy conditions encountered in cold weather climates, the male/female joint interface is orientated with the male portion extending upward from the axle and the female portion extending downward from the vehicular frame. This arrangement prevents foreign matter from accumulating in the well of the female cavity which could potentially cause damage.

The spring portions are designed to be durable and preferably no enclosure is necessary to contain or protect the spring portions when they are properly mounted and positioned between the axle and frame.

Because my suspension enhancer is comprised of two separate spring portions, each portion can be made: a) of the same material having the same density; b) of the same material but having different densities; or, c) of different material having different damping and compressive characteristics. In other words, the damping coefficient of the upper spring portion can be different than the lower spring portion. The ability to vary the compression quality of each portion can permit customized suspension systems which are not possible for suspension systems relying upon a homogenized, single spring configuration.

Besides cellular polyurethane foam, other non-metallic compositions for use as a spring portion can include but are not limited to rubber (natural or butyl) and neoprene.

Because automotive design is not uniform between make and model, configuration of the suspension enhancer of the present invention will vary to some degree; particularly with respect to mounting within the available space between the axle and frame. Thus, the upper and lower portions of my suspension enhancer are secured respectively to the frame and axle by any conventional method used today.

In a preferred embodiment, the spring portions both have proximal ends which are bonded to respective mounting plates. One mounting plate is adapted for operative attachment to an axle and the other mounting plate is adapted for operative attachment to the vehicular frame so that the distal ends of both spring portions are capable of contact with each other. In a more preferred embodiment, two suspension enhancers are equipped per axle.

Accordingly, the term operative attachment is used herein to describe the attachment of each spring portion to either the respective axle or frame. Operative attachment can include the combination of brackets, bolts and nuts, and holes in the mounting plates necessary for securing the spring portion to the vehicle in ways well known to those having skill in the art.

The spring portions are orientated for operative engagement with one another. One portion mounted to the axle and the other portion mounted to the frame and aligned so that the distal ends will mate or operatively engage when either a compression event occurs or when the vehicle is sufficiently loaded with additional weight so the frame will lower and the both portions will contact. Because of the vertical orientation, the springs, and their respective mounting hardware, can be referred to as the top portion and the bottom portion respectively of the suspension enhancer.

Providing a suspension enhancer having separate but mateable top and bottom portions significantly improves driving comfort by allowing more wheel travel which increases the probability of the tires remaining in contact with the ground surface for longer periods of time.

My invention contemplates that at least one of the spring portions be casted from a cellular polyurethane elastomer. The elastomer can be made from at least one isocyanate mixture and a polyol selected from the group consisting of polyether polyol, polyester polyol, or a combination thereof; with water used as a blowing agent during the hot casting process to achieve a density of between 0.35-0.65 g/cc. A process for the production of cellular polyurethane elastomer is described in U.S. Pat. No. 4,735,970; the contents of which are hereby incorporated by reference. A spring portion casted in this manner results in a resilient, homogeneous casting which can be repeatedly compressed 70% of its unstressed length i.e. compressed to 30% of its unstressed length. The casting process creates a foam body with micro-pockets of encapsulated gas throughout the casting which allows the casting to be significantly compressed and possess superior damping characteristics.

Upper and/or lower spring portions consisting of the cellular polyurethane elastomer described above exhibit progressive compression strain behavior up to at least 11,000 lb compressive load; with increased compressive strain (or deformation) of the spring portions the corresponding compressive forces increase exponentially. This progressive or non-linear relationship between compressive force and spring deformation is a desirable characteristic for ride comfort.

In a most preferred embodiment, a novel feature of my invention is to provide a contact interface where both contacting surfaces consist of the cellular polyurethane elastomer described above. Rather than having a resilient rubber material contacting the metallic surface of the axle as is well known in the prior art where the contact can be described as continuous, sudden impacts when travelling over a rough surface, my invention presents a foam-to-foam contact interface which takes advantage of the non-linear load vs. compression rate relationship described earlier. The non-linear load vs. compression rate is improved due to the foam-foam interface as compared to a foam-metal or rubber-metal interface. In other words, the contact surface being foam-to-foam facilitates a more gradual displacement of frame and axle toward each other during a compression event rather than the faster displacement and abrupt termination which occurs with, for example, a bump stop.

A first alternative embodiment for my spring enhancer consists of a lower spring portion having a distal end with a male extension and an upper spring portion having a distal end with a complementary female cavity for interfacing with the distal end of the lower portion, where both spring portions are sized for operative engagement with each other, the upper spring portion having a proximal end bonded to a first plate for mounting to the axle and the lower spring portion having a proximal end attached to a second plate for mounting to the frame. At least one of the spring portions consist of a cellular polyurethane elastomer made from at least one isocyanate mixture and a polyol selected from the group consisting of polyether polyol, polyester polyol, or a combination thereof; with water used as a blowing agent during the hot casting process to achieve a density of between 0.35-0.65 g/cc. The upper spring portion is capable of being mounted to the frame and the lower spring portion capable of being mounted to the axle; and both spring portions are capable of being aligned to each other so the distal ends of each spring portion can contact one another.

A key feature of my invention is to enhance the performance of a vehicle's suspension system by supplementing the conventional factory spring (two per axle) with the addition of my two portion composite suspension enhancer (two per axle) and for use upon at least the rear suspension. Ride comfort can be maximized by optimizing the material shape and density of one spring portion relative to the other. In addition, because my suspension enhancer is properly sized for each vehicle make and model, the lower portion, which is operatively secured to the axle, functions as a landing pad for the upper portion to make contact.

With respect to the shape of the spring portions, the shape can be of any configuration to provide suitable damping. Preferred configurations can include a cylindrical shape, a cylindrical shape including one or more convolutions, and a tapered overall configuration.

My suspension enhancer is capable of enduring high dynamic stress with minimal permanent deformation and exhibits a high degree of abrasion resistance. Use of cellular polyurethane elastomeric spring portions as the preferred embodiment, improves resistance to water absorption and performance will not be compromised in high humidity or aqueous conditions. Because of its gas encapsulated cellular structure, there is reduced transverse expansion during compression.

Installation is simple; incorporating a bracket designed to attach to the frame of a specific vehicle model and another bracket designed to attach to the axle or suspension spring.

DESCRIPTION OF THE PREFERRED EMBODIMENT

The figures provided herein are not drawn to scale and are presented to illustrate the operative relationship of the suspension enhancer to a vehicle.

Figure 1:
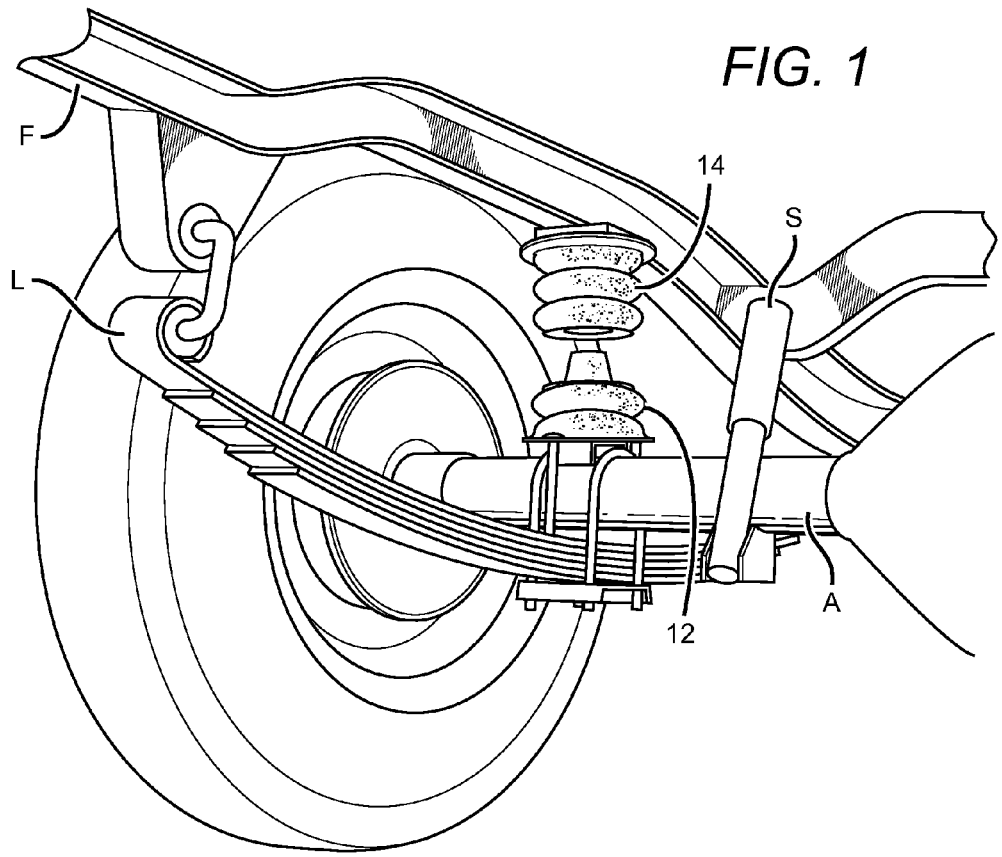
FIG. 1 is a perspective view of the mounting of the suspension enhancer to the rear axle and frame of a vehicle.
Figure 3:
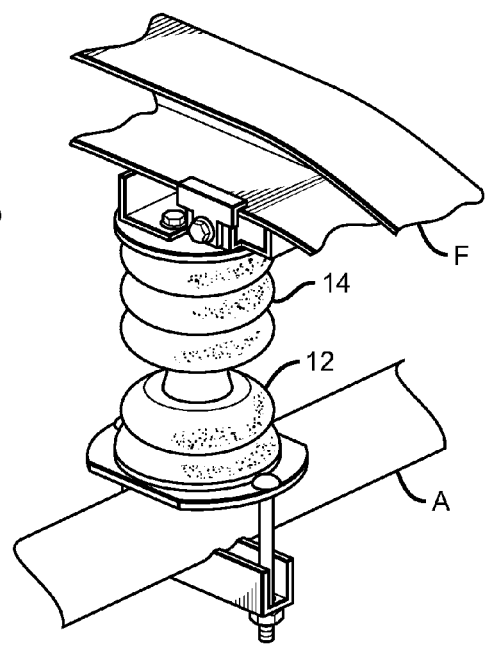
FIG. 3 is a perspective view of the suspension enhancer in relation to the axle and frame of a vehicle.

FIG. 1 is a perspective view of a portion of a rear axle and the suspension components for that side of the axle. Not shown are the similar suspension components and portion of the rear axle for the other side of the vehicle. The generic representation illustrates how upper portion 14 and lower portion 12 of the suspension enhancer can be incorporated as part of the rear suspension of a vehicle having axle A, leaf spring set L and shock absorber S.

Figure 2:
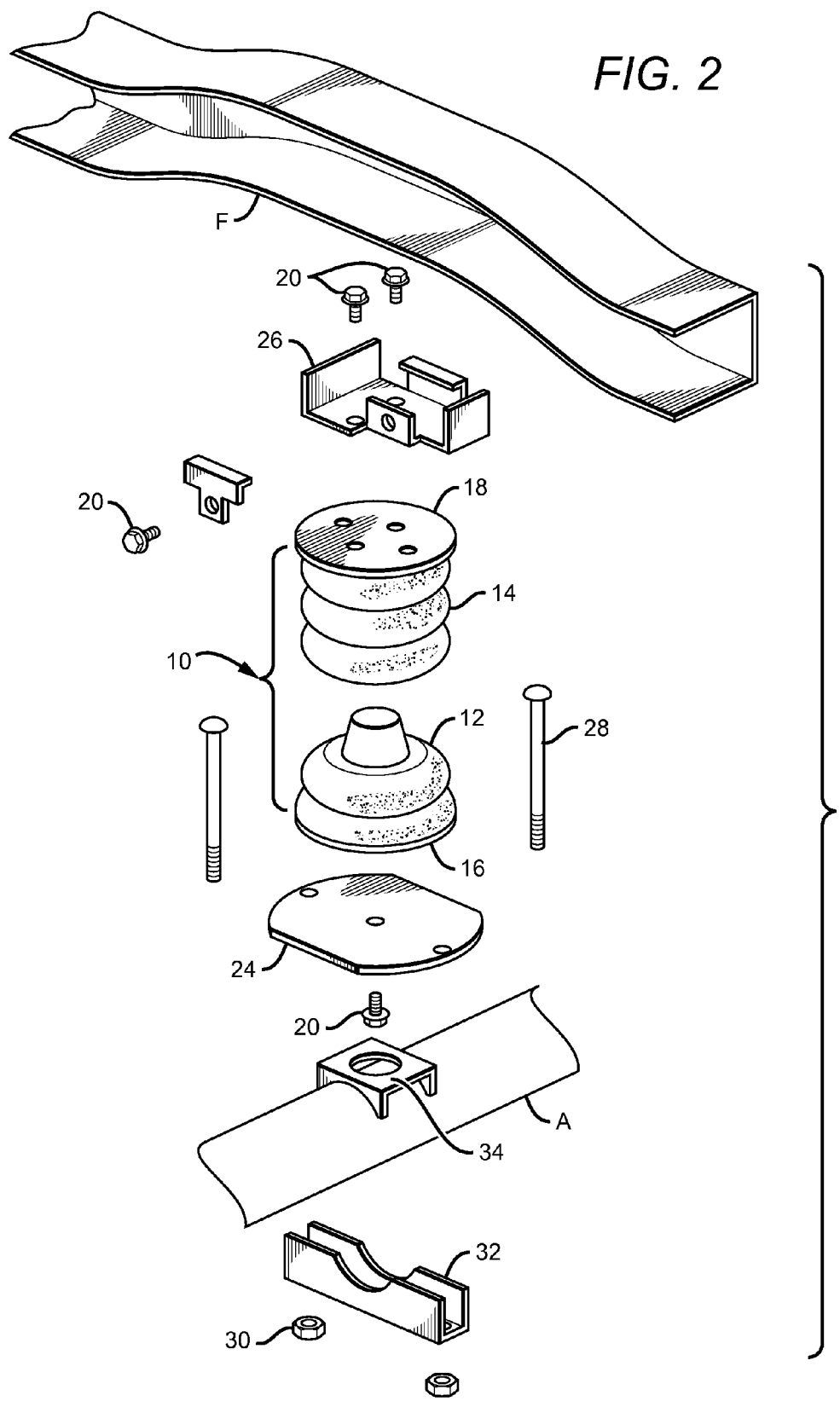
FIG. 2 is an exploded view of my suspension enhancer attached to an axle and the frame of a vehicle.

FIG. 2 illustrates the two portion suspension enhancer 10 along with the component parts necessary to mount to a vehicle.

Lower portion 12 of suspension enhancer 10 would be attached to axle A or spring-pack L and upper portion 14 attached to the vehicle frame F. Two suspension enhancers 10 would preferably be mounted to rear axle A of a vehicle; one for each side of the axle.

Proper positioning and alignment of upper portion 14 and lower portion 12 is illustrated in FIGS. 1, 3, 4, 5 and 6. The distal ends of both upper portion 14 and lower portion 12 face one another.

Bonded to the proximal end of portions 12 and 14 during the casting process are respective end plates 16 and 18; i.e. plate 16 affixed to lower portion 12 and plate 18 affixed to upper portion 14.

End plates 16 and 18 provide structural support when suspension enhancer 10 is operatively aligned and mounted to axle A and frame F. Threaded holes are provided in the proximal ends of portions 12 and 14 to frictionally engage screws 20 to respective mounting brackets 24 and 26. The threaded holes can be created as part of the casting process or can be drilled subsequent to casting. Bolts 28 and nuts 30 are used to mount lower portion 12 to axle A using axle supports 32 and 34.

As can be viewed in FIG. 2, bracket 26 is secured to frame F and bracket 24 is secured to axle A so that respective portions 14 and 12 are vertically aligned with one another.

Portions 12 and 14 are casted from a cellular polyurethane elastomeric structure, preferably made in accordance with the requirements for manufacture of VULKOLLAN® under license from Bayer Aktiengesellschaft.

Figure 4:
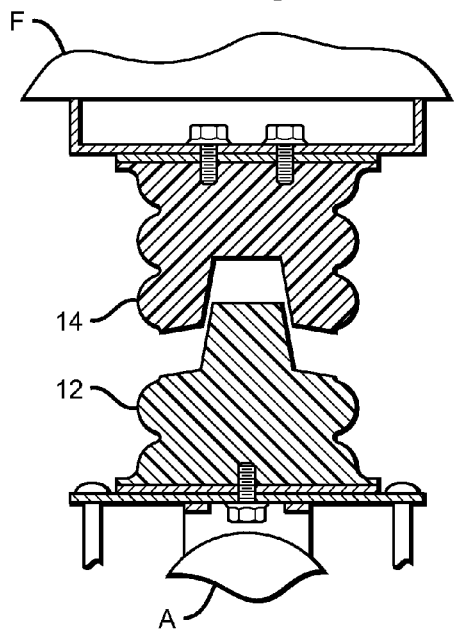
FIG. 4 is a side view of the suspension enhancer relationship to frame and axle of a vehicle at rest.
Figure 5:
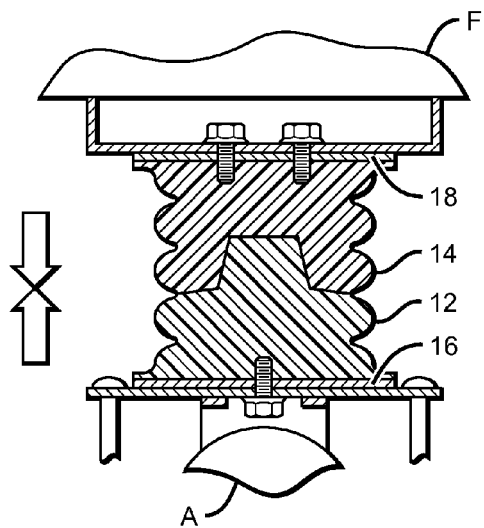
FIG. 5 is a side view of the suspension enhancer during a compression event.
Figure 6:
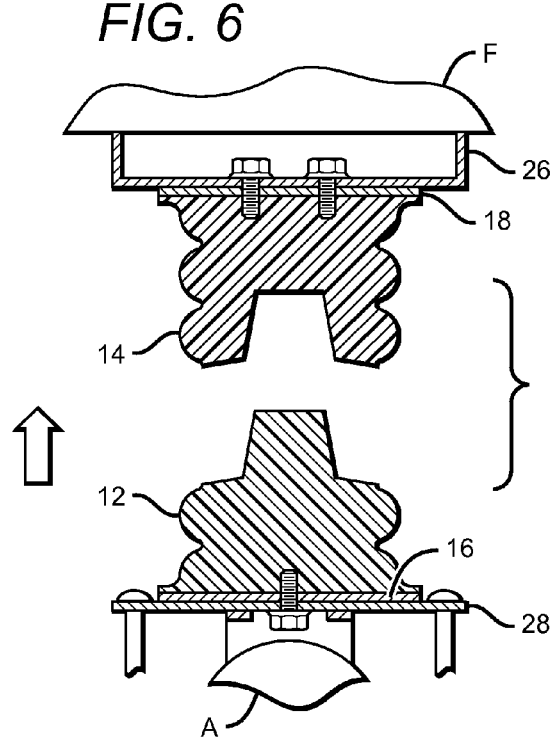
FIG. 6 is a side view of the suspension enhancer during the expansion portion of an oscillation cycle.

Once both the top and bottom portions are mounted to frame and axle respectively, the relationship of upper portion 14 and lower portion 12 are generally in the position illustrated in FIG. 4 and illustrates a gap between the distal surfaces of portions 12 and 14. During a compression event, such as when axle A travels over a speed bump or the like, frame F and axle A will travel in a direction toward each other as represented by the arrows in FIG. 5. The degree of compressibility of lower portion 12 and upper portion 14 will be dependent upon the actual force applied. However, during the upstroke depicted by FIG. 6, the gap spacing is greater than present in FIG. 4 and vertical movement of frame F in the +y direction is not dependent upon expansion of the cellular polyurethane elastomeric structure of either lower portion 12 or upper portion 14. In other words, travel in the +y direction of frame F is not restricted by spring enhancer 10 and is solely dependent upon the rate of elongation of shock absorber S.

Because automotive manufacturers use non-conforming designs, a single configuration for suspension enhancer 10 and the associated mounting equipment is not possible. The precise configuration will be dependent on the suspension-frame specifications of the particular make and model of vehicle for installation and available space between axle and frame. At the very least, the height and width of upper portion 14 and lower portion 12 must be of sufficient mass to permit the desired damping. Weight and height will be dependent upon the type of vehicle. For example, a lighter weight vehicle does not require as much mass for each portion as would a heavier vehicle.

By way of further example, the suspension enhancer of the invention applicable to a 2013 Chevy 3500 will have an upper female portion being approximately 6 inches in diameter and 4.25 inches in height which includes plate 18. The corresponding lower male portion is approximately 6 inches in diameter and 4.75 inches in height which includes plate 16. The male extension of the lower spring portion is tapered from 2 inches diameter to 1.5 inches diameter and is 1.75 inches tall. The male extension inserts into a matching sized female cavity of the upper spring portion. The distal end of the lower spring portion has a flat surface annular region which extends about 1 inch from the base of the male extension out to the perimeter. This flat surface annular area matches with a corresponding annulus on the upper spring portion around the female cavity. Both portions are made of VULKOLLAN® having a density of about 0.47 gm/cc. Because the opposing surfaces of upper and lower portions contact each other, the overall height of the suspension enhancer when contact occurs is approximately 7.25 inches including plates 16 and 18 which themselves are about 0.25 inches thick. The size of the spring enhancer will differ depending on vehicle size. Typically the outside diameter of the spring enhancer will range from 3 inches for lighter vehicles to 6 inches for heavier vehicles and the overall assembled heights can range from under 4 inches for lighter vehicles up to over 8.5 inches for heavier vehicles.

The invention claimed is:

1. A suspension system for a vehicle having a frame, an axle for supporting at least one tire on either end and a pair of shock absorbers supporting the axle to the frame, the improvement comprising:
   a pair of suspension enhancers mounted to the frame and axle, each of said suspension enhancers comprising:
   a lower spring portion mounted to the axle, said lower spring portion having a first end proximal to the axle and a distal end;
   an upper spring portion mounted to the frame, said upper spring portion having a first end proximal to the frame and a distal end; and,
   where the distal ends of said spring portions are positioned to face one another but are not attached to one another; and said upper spring portion can not be subjected to a compressive force unless in contact with said lower spring portion.

2. The suspension system of claim 1 where no enclosure is present to contain said spring portions between the rear axle and frame.

3. The suspension system of claim 1 where a gap exists between the distal ends of said spring portions.

4. The suspension system of claim 3 where the gap between said distal ends of said spring portions increases in response to an increase in distance between the rear axle and frame.

5. The suspension system of claim 1 where the density of said lower spring portion is different than the density of said upper spring portion.

6. The suspension system of claim 1 where each of said spring portions consist of a non-metallic composition.

7. The suspension system of claim 1 where at least one of said spring portions is casted from cellular polyurethane elastomer using a polyol diisocyanate mixture containing naphthalene-1,5-diisocyanate (NDI)-terminated prepolymer, water, and a polyol selected from the group consisting of polyether polyol, polyester polyol, or a combination thereof said elastomer having a density of between 0.35-0.65 g/cc.

8. The suspension system of claim 1 where the distal end of said lower spring portion includes a male extension and where the distal end of said upper spring portion includes a complimentary female cavity.

9. The suspension system of claim 7 where said at least one of said spring portions consist of VULKOLLAN®.

10. A suspension enhancer for installation in a space between the axle and frame of a vehicle consisting of:
    a lower spring portion having a distal end with a male extension;
    an upper spring portion having a distal end with a complementary female cavity for interfacing with the distal end of the lower portion;
    both said spring portions are sized for operative engagement with each other;
    said upper spring portion further having a proximal end bonded to a first plate for mounting to the frame;
    said lower spring portion further having a proximal end attached to a second plate for mounting to the axle;
    at least one of said spring portions consisting essentially of a cellular polyurethane elastomer made from at least one isocyanate mixture and a polyol selected from the group consisting of polyether polyol, polyester polyol, or a combination thereof; with water used as a blowing agent during the hot casting process to achieve a density of between 0.35-0.65 g/cc;

said upper and said lower spring portions capable of being aligned within the space between axle and frame so the distal ends of each spring portion can contact one another.

11. The suspension enhancer of claim 10 where said at least one isocyanate mixture is a polyol diisocyanate mixture containing naphthalene-1,5-diisocyanate (NDI)-terminated prepolymer.

12. The suspension enhancer of claim 10 where said upper spring portion for mounting to the axle includes a first bracket configured for attachment to the frame and where said lower spring portion includes a second bracket configured for attachment to the axle; where each of said brackets have at least one aperture, each having a common axis of symmetry with a respective mounting plate aperture and spring aperture for using a screw to secure a respective bracket to a respective spring portion.

13. A method for providing improved ride stability to a travelling vehicle having a frame and at least two axles and further having a space between both axles and frame comprising the steps of:
   providing a first spring portion having a distal end and proximal end, said proximal end bonded to a first mounting plate for attachment to an axle; and providing a second spring portion having a distal end and a proximal end, said proximal end attached to a second mounting plate for attachment to the frame and the distal end of said second spring portion sized for contact with only the distal end of said first spring portion;
   securing said first mounting plate to the axle where said first spring portion is positioned in a space between the frame and axle and orientated so said distal end faces the adjacent frame; and,
   securing said second mounting plate upon the frame so the distal end of said second spring portion faces the distal end of the adjacent said first spring portion and a gap is defined as the space between said distal ends.

14. The method of claim 13 where at least one of said spring portions consist of a polyol diisocyanate mixture containing naphthalene-1,5-diisocyanate (NDI)-terminated prepolymer and polyol selected from the group consisting of polyether polyol, polyester polyol, or a combination thereof with water used as a blowing agent during the hot casting process to achieve a density of between 0.35-0.65 g/cc.

15. The method of claim 14 where said first spring portion and said second spring portion consist of VULKOLLAN®.

16. The method of claim 13 further comprising the steps of:
   travelling the vehicle and in response to an event causing the space between an axle and frame of the vehicle to increase, the gap between the distal ends of said first spring portion and said second spring portion will increase.

17. A suspension enhancer for installation in a space between the axle and frame of a vehicle comprising:
   a lower spring portion having a distal end with a male extension;
   an upper spring portion having a distal end with a complementary female cavity for interfacing with the distal end of the lower portion;
   both said spring portions are sized for operative engagement with each other;
   at least one of said spring portions consist of cellular polyurethane foam having a density of between 0.35-0.65 g/cc; and,
   said upper and said lower spring portions capable of being aligned within the space between axle and frame so the distal ends of said lower spring portion and said upper spring portion can contact one another.

18. The suspension enhancer of claim 17 where said first spring portion and said second spring portion consist of VULKOLLAN®.

* * * * *